United States Patent
Chevallier et al.

[11] Patent Number: 6,045,182
[45] Date of Patent: Apr. 4, 2000

[54] VEHICLE SEAT PROVIDED WITH A LATERAL AIR BAG

[75] Inventors: Claude Chevallier, Itteville; Philippe Pedronno, Marcoussis, both of France

[73] Assignee: Bertrand Faure Equipements SA, Boulogne, France

[21] Appl. No.: 09/056,125

[22] Filed: Apr. 6, 1998

[30] Foreign Application Priority Data

Apr. 9, 1997 [FR] France .................................. 97 04338

[51] Int. Cl.[7] .................................................. F16B 1/00
[52] U.S. Cl. ................................ 297/216.13; 297/216.1; 280/730.2
[58] Field of Search .............................. 280/730.2, 728.2, 280/730.1, 728.1, 728.3, 792, 743.1; 297/216.13, 216.1

[56] References Cited

U.S. PATENT DOCUMENTS

| | | | |
|---|---|---|---|
| 5,556,127 | 9/1996 | Hurford et al. | 280/730.2 |
| 5,667,242 | 9/1997 | Slack et al. | 280/730.2 |
| 5,683,101 | 11/1997 | Davis et al. | 280/730.2 X |
| 5,845,966 | 12/1998 | Severinski et al. | 297/216.3 |
| 5,876,060 | 3/1999 | Davidson et al. | 280/730.2 |

FOREIGN PATENT DOCUMENTS

| | | |
|---|---|---|
| 19512332 A1 | 10/1995 | Germany . |
| 19642938 A1 | 5/1997 | Germany . |
| 08230603 | 9/1996 | Japan . |
| WO 96/30234 | 10/1996 | WIPO . |
| WO 97/31804 | 9/1997 | WIPO . |

OTHER PUBLICATIONS

French Preliminary Search Report dated Feb. 6, 1998, French Application FR 9704338 filed Apr. 9, 1997.

Primary Examiner—Laurie K. Cranmer
Attorney, Agent, or Firm—Marshall, O'Toole, Gerstein, Murray & Borun

[57] ABSTRACT

A vehicle seat has a back including a lateral air bag disposed in a box integrated in said back. The cover of the seat back includes a cutout located in register with the outer face of the box, and said box is received in a housing in the form of a depression that is laterally open to the outside. The margin of the cover running along the outer face of the box is clamped between said housing and said box.

8 Claims, 1 Drawing Sheet

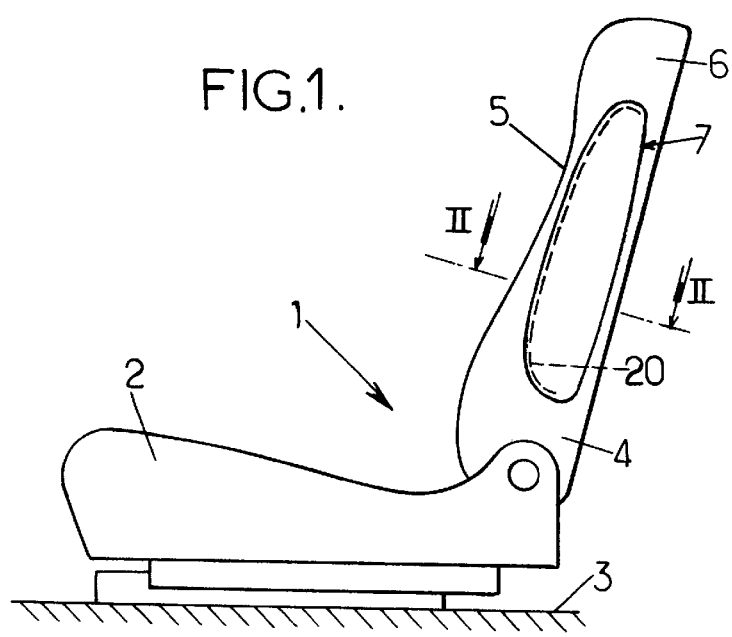
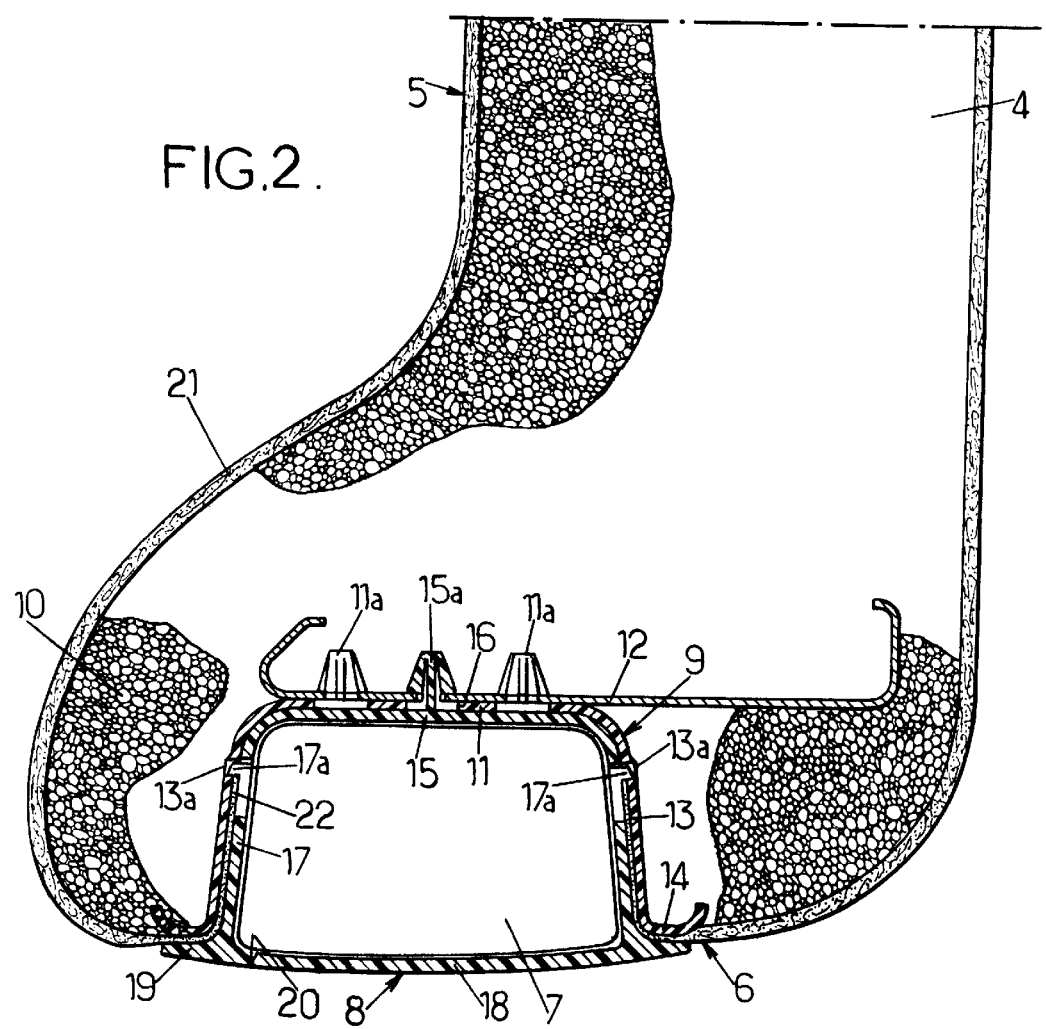

VEHICLE SEAT PROVIDED WITH A LATERAL AIR BAG

FIELD OF THE INVENTION

The present invention relates to vehicle seats provided with lateral air bags.

More particularly, the invention relates to a vehicle seat comprising a seat back which includes padding supported by a rigid frame and covered by a seat cover, the seat back having a front face designed to support the back of a user, and two sides on either side of said front face, said seat back further including at least one air bag type safety device adapted to inflate its bag, causing it to be deployed beside the user in the event of the vehicle being subjected to a predetermined shock, the safety device being disposed in a box provided with a peripheral side wall and with an outer face adapted to open when the bag of the safety device inflates, said box being integrated in the padding in one of the sides of the seat back.

BACKGROUND OF THE INVENTION

In known seats of that type, the seat back cover covers the entire outer face of the box for the safety device, with the cover being provided with tearable stitching to co-operate with said outer face.

Those known seats suffer from the following drawbacks:

it can be difficult to position the tearable stitching of the cover accurately relative to the outer face of the box, since the cover covers said box completely: if it is poorly positioned, then the safety device runs the risk of operating poorly or even of not operating at all in the event of the vehicle being involved in an accident; and it is necessary to validate proper operation of the safety device for each model of seat cover that may be installed on the seat back, since the operation of said safety device relies on the cover tearing: given the large number of models of cover that are possible for each model of vehicle, that gives rise to very many tests and is expensive.

OBJECTS AND SUMMARY OF THE INVENTION

A particular object of the present invention is to mitigate those drawbacks.

To this end, according to the invention, in a vehicle seat of the kind in question the seat cover includes a cutout defined by a margin belonging to said cover and running around the outer face of the box of the safety device, such that said outer face is visible on the side of the seat back, and the box of the safety device is received in a housing in the form of a depression that is laterally open towards the outside and that includes at least one peripheral rim extending over the side wall of said box around the outer face of said box, said margin of the cover covering the peripheral rim of the housing and being clamped between said peripheral rim and the box.

By means of these dispositions, problems of positioning the cover on the seat back are avoided, and proper operation of the safety device is independent of said cover, so it is no longer necessary to validate such proper operation for each type of seat cover used.

In addition, the safety device can be mounted on the seat back after the seat has been fully built, thereby limiting the risk of the safety device being damaged during the process of building said seat.

In preferred embodiments of the invention, use may also be made, optionally, of one or more of the following dispositions:

the housing is fixed to the frame of the seat back by snap-fastening;

the box of the safety device is fixed to the frame of the seat back by snap-fastening through a passage formed in the housing which receives said box;

the housing which receives the box of the safety device includes a side wall, with the side wall of the box of the safety device being fixed thereto by snapfastening;

the box of the safety device is made of a plastics material, the outer face of the box including at least one groove adapted to break so as to enable said outer face to open in the event of the bag of the safety device inflating;

said groove is generally U-shaped, with a base that is substantially vertical and two side branches that extend substantially rearwards from said base;

the margin of the cover is clamped radially between the side wall of the box of the safety device and the housing which receives said box; and the box of the safety device includes a peripheral flange which covers the peripheral rim of the housing receiving said box, the margin of the cover being clamped axially between said peripheral rim of the housing and said peripheral flange of the box.

BRIEF DESCRIPTION OF THE DRAWING

Other characteristics and advantages of the invention appear from the following description of an embodiment thereof given by way of non-limiting example and with reference to the accompanying drawing.

In drawing:

FIG. 1 is a diagrammatic view of a seat constituting an embodiment of the invention; and FIG. 2 is a fragmentary horizontal section view of the seat back shown in FIG. 1, with the section being on line II—II of FIG. 1.

MORE DETAILED DESCRIPTION

FIG. 1 shows a motor vehicle seat 1 comprising a seat proper 2 mounted on the floor 3 of the vehicle, and a seat back 4 mounted on the seat proper.

The seat back 4 has a front face 5 designed to support the back of a user, and two sides 6 on either side of the front face (only one of these sides is visible in FIG. 1).

At least one of the two sides 6, generally the side located towards the outside of the vehicle, is provided with a safety device 7 of the air bag type that is adapted to inflate (generally by means of a pyrotechnic device) and be deployed beside the user in the event of the vehicle being subjected to a predetermined shock.

As shown in FIG. 2, the safety device 7 is located in a closed box 8, e.g. made of plastics material, which box is received in a housing 9 in the form of a depression in the seat back 4 that is open laterally towards the outside of the seat back, said housing being integrated in synthetic foam padding 10 of the seat back 4.

By way of example, the housing 9, which may be made of plastics material, may present:

an inner wall 11 which is fixed to the metal frame 12 of the seat back by snap-fastening, e.g. by means of studs 11a projecting from the inner wall 11 and engaged in holes in the frame 12.

a peripheral side wall 13 that is laterally open toward the outside; and a peripheral rim 14 disposed substantially parallel with the side 6 of the seat back.

The box 8 comprises:

an inner wall 15 snap-fastened to the frame 12 of the seat back, e.g. by means of at least one stud 15a passing through a passage 16 formed in the inner wall 11 of the housing 9, and engaged in a hole of the frame 12, the inner wall 15 of the box thus being clamped against the inner wall 11 of the housing 9;

a peripheral side wall 17 tightly engaged in the side wall 13 of the housing 9, the side wall 17 preferably including lugs 17a that snap into recesses 13a formed in the side wall 13 of the housing 9; and an outer wall 18 which is visible from the outside in the side 6 of the seat back, said outer wall preferably being extended by a peripheral flange 19 covering the rim 14 of the housing 9.

The outer wall 18 of the box 8 is adapted to open when the air bag of the safety device inflates.

To this end, the outer wall 18 may include one or more grooves 20 which break when said bag inflates, said groove (s) being generally U-shaped, for example, with a base that is substantially vertical and two side branches that extend rearwards from said base (see FIG. 1).

Furthermore, the cover 21 made of cloth, leather, etc., that covers the padding 10 of the seat back includes a margin 22 around a cutout located in register with the box 8. The margin 22 covers the rim 14 and a portion of the side wall 13 of the housing 9, and said margin 22 is clamped radially between the side walls 13 and 17 and axially between the rim 14 and the flange 19 belonging respectively to the housing 9 and to the box 8, thereby making it easy to fix said margin 22 of the cover in place.

Optionally, the rim 14 of the housing 9 and/or the flange 19 of the box 8 can be provided with spikes to hold the margin 22 of the cover more securely.

It will also be observed that the box 8 and the safety device 7 that it contains can be put into place on the seat back after the seat back has itself been fully built, thereby avoiding any damage to the safety device during the process of building the seat back.

We claim:

1. A vehicle seat comprising a seat back which includes padding supported by a rigid frame and covered by a seat cover, the seat back having a front face designed to support the back of a user, and two sides on either side of said front face, said seat back further including at least one air bag type safety device adapted to inflate its bag, causing it to be deployed beside the user in the event of the vehicle being subjected to a predetermined shock, the safety device being disposed in a box provided with a peripheral side wall and with an outer face adapted to open when the bag of the safety device inflates, said box being integrated in the padding in one of the sides of the seat back and the peripheral side wall of the box being substantially perpendicular to said side of the seat back, wherein the seat cover includes a cutout defined by a margin belonging to said cover and running around the outer face of the box of the safety device, such that said outer face is visible on the side of the seat back, and wherein the box of the safety device is received in a substantially rigid housing coupled to the frame, said housing being in the form of a depression that is laterally open towards the outside and that includes at least one peripheral rim extending along the side wall of said box around the outer face of said box, said peripheral rim being substantially perpendicular to the side of the seat back and fitting tightly inside the peripheral side wall of the box, and said margin of the cover covering the peripheral rim of the housing and being clamped between said peripheral rim and the peripheral side wall of the box.

2. A seat according to claim 1, in which the housing is fixed to the frame of the seat back by snap-fastening.

3. A seat according to claim 1, in which the box of the safety device is fixed to the frame of the seat back by snap-fastening through a passage formed in the housing which receives said box.

4. A seat according to claim 1, in which the housing which receives the box of the safety device includes a side wall, with the side wall of the box of the safety device being fixed thereto by snap-fastening.

5. A seat according to claim 1, in which the box of the safety device is made of a plastics material, the outer face of the box including at least one groove adapted to break so as to enable said outer face to open in the event of the bag of the safety device inflating.

6. A seat according to claim 5, in which said groove is generally U-shaped, with a base that is substantially vertical and two side branches that extend substantially rearwards from said base.

7. A seat according to claim 6, in which the margin of the cover is clamped radially between the side wall of the box of the safety device and the housing which receives said box.

8. A seat according to claim 1, in which the box of the safety device includes a peripheral flange which covers the peripheral rim of the housing receiving said box, the margin of the cover being clamped axially between said peripheral rim of the housing and said peripheral flange of the box.

* * * * *